United States Patent

Macemon

[15] 3,684,121
[45] Aug. 15, 1972

[54] SILO LUG
[72] Inventor: Wallace J. Macemon, Madison, Wis.
[73] Assignee: Martin Marietta Corporation, New York, N.Y.
[22] Filed: May 18, 1970
[21] Appl. No.: 38,310

[52] U.S. Cl. .................................................. 217/95
[51] Int. Cl. ............................................. B65d 9/38
[58] Field of Search .............. 217/95, 94; 287/61, 62; 204/50 R

[56] References Cited

UNITED STATES PATENTS

| | | | |
|---|---|---|---|
| 1,055,986 | 3/1913 | Bossert | 217/95 |
| 2,124,657 | 7/1938 | Ritzenthaler et al. | 204/50 R |
| 2,389,179 | 11/1945 | Brown | 204/50 R X |

*Primary Examiner*—Raphael H. Schwartz
*Attorney*—John A. Crowley, Jr. and Alvin H. Fritschler

[57] ABSTRACT

A cast silo lug combining compact structure with superior strength has a body portion with two holes therein, a curved lip section associated with each hole and a mounting section for positioning the lug against the wall of a silo. The holes are positioned at opposite ends of the body portion. One lip section extends outward from the body portion and around the part of the circumference of a hole facing the end of said body portion. The second lip section extends in the same manner outward from and around the other hole but on the opposite side of the body portion. The threaded end portions of silo encircling rods are passed through the holes in opposing directions, the lip sections associated with each hole serving to support the rod passing through the hole. On the side of each hole opposite the lip section, a bearing surface is provided for the retaining nut used to secure and tighten the encircling rods to the wall of the silo.

12 Claims, 7 Drawing Figures

INVENTOR
WALLACE J. MACEMON

BY

ATTORNEY

SILO LUG

BACKGROUND OF THE INVENTION

1. Field of the Invention

This invention relates to an improved silo lug. More particularly, it relates to a cast silo lug having minimum size and superior strength.

2. Description of the Prior Art

Commercial silo lugs are made both by casting from malleable iron and by pressing from sheet metal. Such lugs are generally in the form of a hollow W-shaped structure with end portions each of which have two holes therein. Silo rods are positioned with their threaded end portions passing through the holes in the lugs in opposing directions, as shown in the Rutten U.S. Pat. No. 2,968,416 and in the De Muth U.S. Pat. No. 3,329,296. The lugs illustrated in these patents are formed from sheet metal stampings and are intended to overcome some of the weakness previously encountered in fabricated lugs.

As the size of silos and similar structures increases to meet ever expanding storage needs and requirements, the silo encircling hoops must be of greater diameter, increasing the need for lugs that are of greater strength and durability but which can be made easily and cheaply. While cast lugs have inherent advantages over fabricated lugs, a genuine need exists in the art for cast lugs having enhanced strength while, at the same time, being of simple construction, inexpensive cost and simplicity of use.

It is an object of the present invention, therefore, to provide an improved cast silo lug.

It is another object of the invention to provide a cast silo lug having superior qualities of strength and durability.

It is another object to provide a cast silo lug of compact design and minimum cost of manufacture.

It is a further object of the invention to provide a cast silo lug particularly desirable for use on silos of large diameter.

These and other objects are achieved by means of the cast silo lug hereinafter described in detail, the novel features thereof being particularly pointed out in the appended claims.

SUMMARY OF THE INVENTION

The cast silo lug of the present invention has a body portion having two holes therein through which the threaded end portions of silo rods are passed in opposite directions. A mounting section extends along one edge of the body portion so that the lug can conveniently be positioned against the side wall of a silo. As so positioned, the hole positioned at one end of the body portion will be above that of the hole at the opposite end of the body portion. A curved lip section extending outward and around the part of the circumference of the hole facing the end of the body portion is provided at each hole, with the lip section at one end being on the opposite side of the body portion from that at the other end thereof. The lip sections provide support and alignment for the rod end portions being secured by the lug, minimize any tendency of the rod to twist the lug upon tightening and enhance the strength and durability of the lug in use. The body portion of the lug, on the side of each hole opposite that on which the rod-supporting lip section is provided, has a bearing surface upon which the rod-retaining nut may be tightened. The lug may be positioned on the silo wall so that the lower lip section, corresponding hole in the body portion and bearing surface on the opposite side of said body portion are oriented so as to secure and tighten the upper end of an inclined silo rod against the silo wall, while the upper lip section, hole and bearing surface are corresponding oriented to support the opposite end of the next adjoining rod at a similar inclination on the silo wall.

BRIEF DESCRIPTION OF THE DRAWINGS

The present invention is hereinafter described in further detail with reference to the accompanying drawing in which.

DETAILED DESCRIPTION OF THE INVENTION

Figure 1:
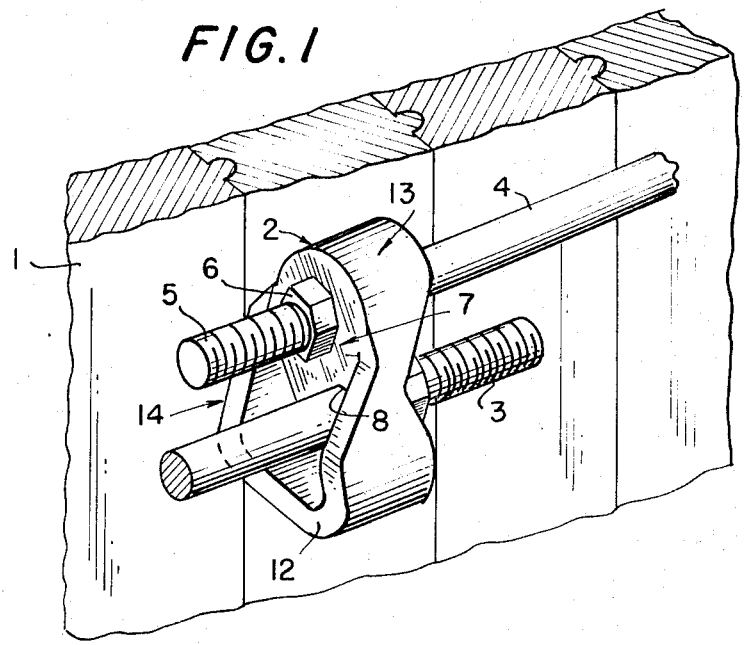
FIG. 1 is a front perspective view showing a silo lug of the present invention in use with the two opposing threaded ends of silo encircling rods fastened therethrough with a portion of the silo wall also being shown.
Figure 4:
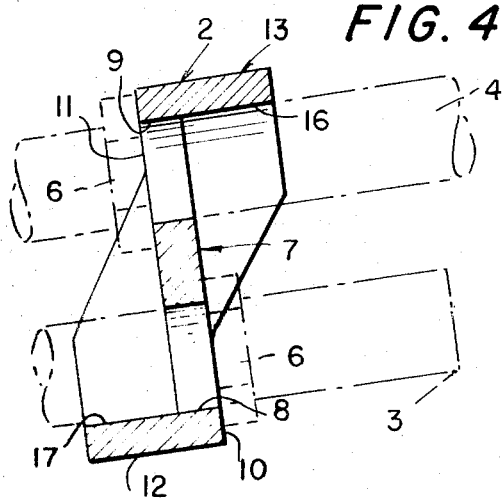
FIG. 4 is a front plan sectional view taken along line 4—4 of FIG. 3.

Silo-strengthening hoops may be formed from one or more silo encircling rods having the end portions secured by silo lugs. On the relatively large silos presently in existence, it is common to utilize three or five rods in the formation of each hoop. As shown in FIG. 1, the adjoining ends of silo encircling rods 3 and 4 having threaded end portions, as represented by end portion 5 of rod 4, are secured to silo wall 1 by means of cast silo lug 2 in accordance with the present invention. Retaining nuts 6, shown in FIGS. 1 and 4, are used to secure rods 3 and 4 to silo lug 2 and to tighten the rods to silo wall 1.

Figure 3:
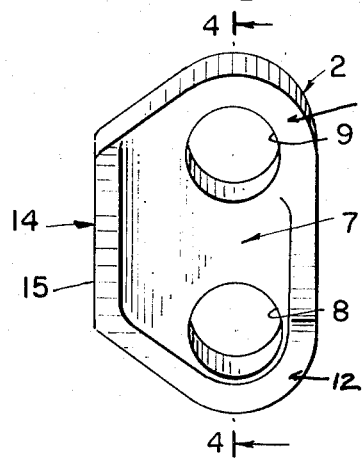
FIG. 3 is a side elevational view of the same silo lug.

As best illustrated in FIG. 3, silo lug 2 has a body portion 7 having two holes, i.e. holes 8 and 9, positioned therein at opposite ends of said body portion 7. Body portion 7 has bearing surface 10 around hole 8, said bearing surface 10 being flat and normal to the longitudinal axis of hole 8 so that retaining nut 6 tightened on the threaded end portion of silo rod 3 may bear against said surface 10 to tighten rod 3 against silo wall 1 as shown in FIGS. 1 and 4. Body portion 7 likewise has bearing surface 11 around hole 9, said bearing surface 11 being flat and normal to the longitudinal axis of hole 9 so that retaining nut 6 used to tighten rod 4 against silo wall 1 may bear against said surface 11. As can be seen in FIG. 4, bearing surface 10 associated with hole 8 is on the opposite side of body portion 7 from bearing surface 11 associated with hole 9. The ends of rods 3 and 4 are positioned through said holes 8 and 9, respectively, in opposing directions. Upon tightening of retaining nuts 6 against bearing surfaces 10 and 11 to tighten rods 3 and 4 against silo wall 1, body portion 7 is put in compression resulting in greatly increased strength of said silo lug 2.

In order to provide support and alignment for rod 3 in hole 8 of body portion 7, curved lip section 12 having rod support surface 17 is provided. This section of lug 2, as can be seen most clearly in FIGS. 1 and 3, extends outward from body portion 7 and curves around the periphery of hole 8 on that portion of the circumference of hole 8 that is positioned toward the end section, i.e. the downward end section as shown in FIG. 3, of body portion 7. Inner rod support surface 17 of lip section 12 is thus coextensive with the side wall of hole 8 and extends outward from body portion 7 at an angle of 90 to bearing surface 10 in position to support silo rod 3 passing through hole 8 in said body portion 7. Lip section 12 is positioned on the opposite side of body portion 7 from said bearing surface 10 associated with said hole 8 in body portion 7.

In a similar manner, curved lip section 13 provides support and alignment for silo rod 4 passing through hole 9. Lip section 13 extends outward from body portion 7 and curves around the periphery of hole 9 on that portion of the section, i.e. the upward end section, of body portion 7. Rod support surface 16 on the inner portion of said lip section 13 is thus in position to support rod 4 passing through hole 9 in body portion 7. As seen in FIG. 4, lip section 13 is positioned on the opposite side of body portion 7 from bearing section 11 associated with said hole 9 in body portion 7. Lip section 13 thus extends outward on the opposite side of body portion 7 from lip section 12 as can clearly be seen in FIGS. 1, 2, 4 and 5.

Figure 5:
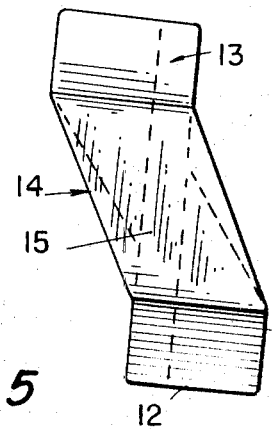
FIG. 5 is a rear plan view of the same silo lug.

In order to conveniently mount lug 2 against silo wall 1, the lug is formed with a mounting section 14 extending along one edge of body portion 7 as seen in FIGS. 1, 2, 3, 4 and 5. Mounting section 14, which has a flat outer surface 15 for positioning against silo wall 1, is conveniently formed as an extension to curved lip sections 12 and 13 on opposite sides of body portion 7 so as to assume a trapezoidal shape as shown in FIG. 5. Mounting section 14 not only provides a convenient surface for placing the lug in a desired position against silo wall 1, but also serves to add strength to the rod-supporting lip sections with which it is joined. Mounting section 14 thus extends outward along one edge of body portion 7 so that the outer surface 15 thereof is in a plane generally perpendicular to the longitudinal plane of said body portion 7.

Figure 2:
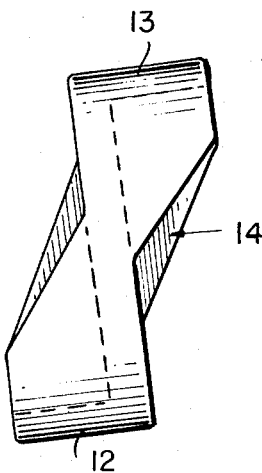
FIG. 2 is a front plan view of the lug shown in FIG. 1.

Silo lug 2 cast in the shape as described above can be placed with flat mounting surface 15 against silo wall 1 with hole 9 at the upper end and hole 8 at the lower end of body portion 7 at approximately equal distance from said silo wall. The lug may be positioned at an inclined angle, e.g. as shown in FIG. 2, so as to accommodate rods positioned against the wall of the silo at such inclination. In this position, the lip sections of the lug provide a more effective supporting surface for the rods being secured by the lug. The amount of inclination desired, if any, can be controlled simply by the position in which the lug is placed with its mounting surface against the silo wall and, as such, does not form a part of this invention.

Figure 6:
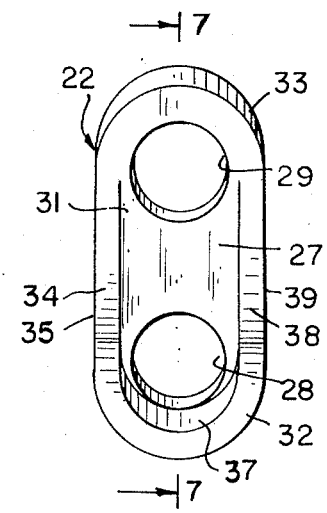
FIG. 6 is a side elevational view of another embodiment of the silo lug of the present invention.
Figure 7:
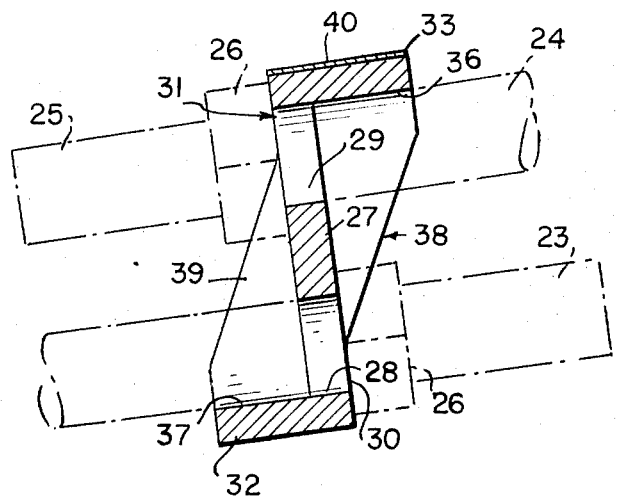
FIG. 7 is a front plan sectional view taken along line 7—7 of FIG. 3.

In the embodiment of the invention shown in FIGS. 6 and 7, the silo lug generally represented by the numeral 22 is cast in a symmetrical form with mounting sections 34 and 38 provided on either edge of body portion 27. In this form, the lug has added convenience in use and the possibility of inadvertently positioning the lug with the edge not constituting the desired mounting surface against the silo wall is avoided. Any possibility of lug tipping due to such inadvertence is, of course, likewise averted.

In this embodiment, body portion 27 has two holes, i.e. holes 28 and 29, positioned therein at opposite ends thereof. Body portion 27 has bearing surface 30 around hole 28, said surface 30 being flat and normal to the longitudinal axis of hole 28 so that retaining nut 26 tightened on the threaded end portion of silo rod 3 may bear against said bearing surface 30 to tighten rod 23 against the silo wall. Body portion 27 also has bearing surface 31 around hole 29, said surface 31 being flat and normal to the longitudinal axis of said hole 29 so that retaining nut 26 used to tighten rod 24 having threaded end portion 25 against the silo wall may bear against said surface 31. As shown in FIG. 7, bearing surface 30 associated with hole 28 is on the opposite side of body portion 27 from bearing surface 31 associated with hole 29. Once again, the ends of rods 23 and 24 are positioned through said holes 28 and 29, respectively, in opposing directions. The strength of body portion 7 is greatly enhanced by being put into compression upon tightening of retaining nuts 26 against bearing surfaces 30 and 31 to tighten rods 23 and 24 against the wall of the silo.

As with the previously described embodiment, curved lip section 32 having rod support surface 37 and curved lip section 33 having rod support surface 36 are provided, with said support surfaces 37 and 36 being at an angle of 90° to bearing surfaces 30 and 31, respectively. Tip sections 32 and 33 extend outward on opposite sides of body portion 27 and curve around the periphery of holes 28 and 29, respectively, on that portion of the circumference of the holes that are positioned toward the opposite end sections of body portion 27. Rod support surfaces 37 and 36 are thus in position to support rods 23 and 24 passing through holes 28 and 29, respectively, in body portion 27.

In the embodiment of FIGS. 6 and 7, silo lug 22 is formed with mounting section 34 extending along one edge of body portion 27 and mounting section 38 extending along the opposite edge thereof. Mounting section 34 has a flat outer surface 35 for positioning against the silo wall. Mounting section 38 likewise has a flat outer surface 39 for positioning against silo wall. In application, of course, lug 22 can be positioned with either outer surface 35 or said surface 39 against the silo wall. Mounting sections 34 and 38 are conveniently formed as extensions to curved lip sections 32 and 33 on opposite sides of body portion 27 so as to assume a trapezoidal shape as shown for mounting section 38 in FIG. 7. Mounting sections 34 and 38 not only provide convenient surfaces for mounting lug 22 in the desired position against the silo wall, but also serve to strengthen rod-supporting lip sections 32 and 33 with which they are joined. Mounting sections 34 and 38 thus extend outward from opposite edges of body portion 27 so that the outer surfaces 35 and 39 thereof, respectively, are in planes generally perpendicular to the longitudinal plane of said body portion 27.

The lug of this invention can conveniently be cast by conventional means known in the art. The lug may be cast from malleable iron and may be cadium plated as indicated at 40 of FIG. 7. Other suitable materials, such as brass or bronze may also be employed and the lug may be galvanized if desired.

The silo lug of the present invention is a conveniently formed lug that is smaller, cheaper to build and stronger than conventional lugs heretofore used in the art. This novel lug can be made in an appreciably smaller form, with less material cost, than conventional lugs. Because of its compactness, this lug can eliminate up to 3 inches of length per silo rod as compared with the rods required for use with conventional W-shaped lugs on silos of equal diameter. In addition to the inherent advantages of using such unitary cast lugs, it has also been found that the smaller, cheaper cast lug of the invention is appreciably stronger than lugs heretofore available, offering up to a 50 percent increase in strength.

The novel lug of the present invention can be made for securing any conventional silo rods, with ½ inch rods, 9/16 inch rods and 11/16 inch rods being commonly employed. It will be appreciated, in addition, that the features and advantages herein set forth pertain not only to the use of the novel lug of the present invention for securing or tying together the ends of hoops or rods on silos, but also on tanks and any similar structures, the compactness, convenience and inherent strength of this lug offering distinct and significant advantages not heretofore available in the art.

Therefore, I claim:

1. A cast silo lug adapted to secure silo encircling rods comprising:
   a. a body portion having two holes therein positioned at opposite ends of said body portion and adapted to receive said silo rods, said body portion having a first bearing surface around the periphery of the first hole on one side of said body portion and a second said bearing surface around the periphery of the second hole on the opposite side of the body portion, said first and second bearing surfaces being adapted to support the retaining nuts with which the threaded end sections of the silo rods passing through said holes are secured, said bearing surfaces being normal to the longitudinal axes of said holes;
   b. a first curved lip section on the side of said body portion opposite said bearing surface associated with said first hole, said lip section extending outward from said body portion and around the part of the circumference of said first hole facing the end section of said body portion at which said first hole is positioned and having an inner rod support surface at an angle of about 90° to said first bearing surface, so as to support the silo rod end section passing through said first hole;
   c. a second curved lip section on the side of said body portion opposite said bearing surface associated with said second hole, said lip section extending outward from said body portion and around the part of the circumference of said second hole facing the end section of said body portion at which said second hole is positioned and having an inner rod support surface at an angle of about 90° to said second bearing surface, so as to support the silo rod end section passing through said second hole;
   d. a first mounting section extending along one edge of said body section and having first flat outer mounting surface for positioning against said silo, said first outer surface being in a plane generally perpendicular to the longitudinal plane of said body portion, said body portion thus being capable of positioning with one of said holes located above the other when said first flat outer mounting surface is positioned against the side wall of said silo; and
   e. a second mounting section extending along the opposite edge of said body portion and having a second flat outer mounting surface for positioning against said silo, said second outer surface being in a plane generally perpendicular to the longitudinal plane of said body portion, said body portion thus being capable of positioning with one of said holes located above the other when said second flat outer mounting surface is positioned against the side wall of said silo,
   whereby the opposite ends of silo encircling rods may be passed through said first and second holes and secured by retaining nuts, said rods being supported by said first and second lip sections on opposite sides of said body portion, the size of said lug and the length of the associated silo encircling rods thereby being minimized while the strength of said silo lug is enhanced by the compressive action of the retaining nuts bearing against opposite sides of said body portion.

2. The apparatus of claim 1 in which said holes in the body portion of the lug are adapted to accommodate ½ inch silo rods.

3. The apparatus of claim 1 in which said holes are adapted to accommodate 9/16 inch silo rods.

4. The apparatus of claim 1 in which said holes are adapted to accommodate 11/16 inch silo rods.

5. The apparatus of claim 1 in which said cast silo lug comprises a cast malleable iron lug.

6. The apparatus of claim 5 in which said lug is cadmium plated.

7. A cast silo lug adapted to secure silo encircling rods comprising:
   a. a body portion having two holes therein positioned at opposite ends of said body portion and adapted to receive said silo rods, said body portion having a first bearing surface around the periphery of the first hole on one side of said body portion and a second said bearing surface around the periphery of the second hole on the opposite side of said body portion, said first and second bearing surfaces being adapted to support the retaining nuts with which the threaded end sections of the silo rods passing through said holes are secured, said bearing surfaces being normal to the longitudinal axes of said holes;
   b. a first curved lip section on the side of said body portion opposite said bearing surface associated with said first hole, said lip section extending outward from said body portion and around the part of the circumference of said first hole facing the end section of said body portion at which said first hole is positioned and having an inner rod support surface at an angle of about 90° to said first bearing surface, so as to support the silo rod end section passing through said first hole;

c. a second curved lip section on the side of said body portion opposite said bearing surface associated with said second hole, said lip section extending outward from said body portion and around the part of the circumference of said second hole facing the end section of said body portion at which said second hole is positioned and having an inner rod support surface at an angle of about 90° to said second bearing surface, so as to support the silo rod end section; and d. a mounting section extending along one edge of said body section and having a flat outer mounting surface for positioning against said silo, said outer surface being in a plane generally perpendicular to the longitudinal plane of said body portion, said body portion thus being capable of positioning with one of said holes located above the other when said flat outer mounting surface is positioned against the side wall of said silo, whereby the opposite ends of silo encircling rods may be passed through said first and second holes and secured by retaining nuts, said rods being supported by said first and second lip sections on opposite sides of said body portion, the size of said lug and the length of the associated silo encircling rods thereby being minimized while the strength of said silo lug is enhanced by the compressive action of the retaining nuts bearing against opposite sides of said body portion.

8. The apparatus of claim 7 in which said holes in the body portion of the lug are adapted to accommodate ½ inch silo rods.

9. The apparatus of claim 7 in which said holes in the body portion of the lug are adapted to accommodate 9/16 inch silo rods.

10. The apparatus of claim 7 in which said holes in the body portion of the lug are adapted to accommodate 11/16 inch silo rods.

11. The apparatus of claim 7 in which said cast silo lug comprises a cast malleable iron lug.

12. The apparatus of claim 11 in which said lug is cadmium plated.

* * * * *